United States Patent
Tsuda (10) Patent No.: US 11,941,763 B2
(45) Date of Patent: Mar. 26, 2024

(54) VIEWING SYSTEM, MODEL CREATION APPARATUS, AND CONTROL METHOD

(71) Applicant: SQUARE ENIX CO., LTD., Tokyo (JP)

(72) Inventor: Makoto Tsuda, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 17/077,931

(22) Filed: Oct. 22, 2020

(65) Prior Publication Data

US 2021/0142573 A1 May 13, 2021

(30) Foreign Application Priority Data

Nov. 7, 2019 (JP) ................................. 2019-202576
Jun. 19, 2020 (JP) ................................. 2020-106386

(51) Int. Cl.
*G06T 19/00* (2011.01)
(52) U.S. Cl.
CPC ................................. *G06T 19/006* (2013.01)
(58) Field of Classification Search
CPC ....... G06T 19/006; G06T 17/00; A63F 13/23; A63F 13/217
See application file for complete search history.

(56) References Cited

U.S. PATENT DOCUMENTS

| | | | |
|---|---|---|---|
| 9,478,068 B2 | 10/2016 | Hayakawa | |
| 10,460,516 B1 * | 10/2019 | Eastham | G06T 17/20 |
| 10,783,284 B2 * | 9/2020 | Loberg | G06F 30/13 |
| 2011/0052045 A1 | 3/2011 | Kameyama | |
| 2014/0267792 A1 * | 9/2014 | Mullins | H04N 1/00244 |
| | | | 348/207.1 |
| 2015/0235474 A1 * | 8/2015 | Mullins | G06T 19/006 |
| | | | 345/419 |
| 2018/0053055 A1 * | 2/2018 | Finding | G06T 19/006 |
| 2018/0114363 A1 | 4/2018 | Rosenbaum | |
| 2019/0116322 A1 * | 4/2019 | Holzer | G06V 10/34 |
| 2020/0012854 A1 | 1/2020 | Fu et al. | |
| 2020/0368616 A1 * | 11/2020 | Delamont | G06T 13/40 |
| 2021/0279967 A1 * | 9/2021 | Gernoth | G06F 9/453 |
| 2022/0130115 A1 * | 4/2022 | Assouline | G06T 19/20 |

(Continued)

FOREIGN PATENT DOCUMENTS

| | | |
|---|---|---|
| CN | 105701863 A | 6/2016 |
| CN | 105741343 A | 7/2016 |
| CN | 107481327 A | 12/2017 |

(Continued)

OTHER PUBLICATIONS

Office Action for JP Application No. 2020-106386, dated May 7, 2021 and English translation thereof.

(Continued)

*Primary Examiner* — Chante E Harrison
(74) *Attorney, Agent, or Firm* — Dorsey & Whitney LLP (57) ABSTRACT

A viewing system which presents augmented reality of a 3D model representing an appearance of a target, comprises: an obtainer which is able to obtain a captured image of the target; a creator which is able to create a 3D model of the target based on the captured image obtained by the obtainer; and a presenter which is able to present the 3D model of the target created by the creator.

18 Claims, 7 Drawing Sheets

(56) References Cited

U.S. PATENT DOCUMENTS

2022/0157000 A1\* 5/2022 Assouline ............... G06T 13/40

FOREIGN PATENT DOCUMENTS

| CN | 109891466 | A | | 6/2019 | | |
|---|---|---|---|---|---|---|
| CN | 108136257 | B | \* | 9/2021 | ........... | A63F 13/213 |
| CN | 107484428 | B | \* | 10/2021 | ............... | G06K 9/66 |
| CN | 109069929 | B | \* | 7/2022 | ........... | A63F 13/213 |
| JP | 2004234549 | A | | 8/2004 | | |
| JP | 2013097588 | A | | 5/2013 | | |
| JP | 2015038699 | A | | 2/2015 | | |
| JP | 6021568 | B2 | | 10/2016 | | |
| JP | 2020149733 | A | \* | 9/2020 | ........... | A63F 13/217 |
| KR | 20210019552 | A | \* | 2/2021 | | |
| WO | WO-2021061821 | A1 | \* | 4/2021 | ............. | G06F 3/011 |

OTHER PUBLICATIONS

Japanese Office Action dated Nov. 19, 2021 with English Translation for Japanese Application No. 2020-106386; pp. all.
[English Translation] Notice of First Examination Opinion for Chinese Patent Application No. 2020112218436 dated Dec. 4, 2023, pp. all.

\* cited by examiner

VIEWING SYSTEM, MODEL CREATION APPARATUS, AND CONTROL METHOD

CROSS-REFERENCE TO RELATED APPLICATIONS

This application claims priority to and the benefit of Japanese Patent Application No. 2019-202576 filed on Nov. 7, 2019, and Japanese Patent Application No. 2020-106386 filed on Jun. 19, 2020, the entire disclosures of which are incorporated herein by reference.

BACKGROUND OF THE INVENTION

Field of the Invention

The present invention relates to a viewing system, a model creation apparatus, and a control method, and particularly to a technique of presenting augmented reality.

Description of the Related Art

An image that looks as if a virtual object existed in a physical space can be generated by specifying the position and posture of a terminal based on feature points in the physical space included in a captured image, rendering a virtual object in a mode corresponding to the position and posture of the terminal, and overlaying the virtual object on the captured image. See Japanese Patent No. 6021568.

A virtual object presented in Japanese Patent No. 6021568 is created in advance and may not have an appearance or the like the user wants. Some virtual objects allow the user to set the pose of a three-dimensional (3D) model of the virtual object. However, pose setting is difficult for a user having no knowledge of 3D graphics, and it is still hard to give an appearance or the like the user wants.

SUMMARY OF THE INVENTION

At least one embodiment of the present invention has been made to overcome the above-described problems and has as its object to provide a viewing system, model creation apparatus, and control method for implementing presentation of augmented reality in a mode the user wants.

The present invention in its first aspect provides a viewing system which presents augmented reality of a 3D model representing an appearance of a target, comprising: an obtainer which is able to obtain a captured image of the target; a creator which is able to create a 3D model of the target based on the captured image obtained by the obtainer; and a presenter which is able to present the 3D model of the target created by the creator.

The present invention in its second aspect provides a model creation apparatus which creates a 3D model representing an appearance of a target, comprising: an obtainer which is able to obtain a captured image of the target; a creator which is able to create a 3D model of the target based on the captured image obtained by the obtainer; and an outputter which is able to output the 3D model of the target created by the creator.

The present invention in its third aspect provides a method of controlling a model creation apparatus which creates a 3D model representing an appearance of a target, the method comprising: obtaining a captured image of the target; creating a 3D model of the target based on the captured image obtained in the obtaining; and outputting the 3D model of the target created in the creating.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

The following embodiment will explain an example in which the present invention is applied to, as an example of a viewing system, a smartphone including an image capturing device and a server configured to be able to communicate with the smartphone. However, the present invention is applicable to an arbitrary device capable of creating a 3D model of a target based on a captured image, and an arbitrary device capable of presenting augmented reality by displaying the 3D model together with the captured image.

<<Arrangement of Viewing System>>

The arrangement of the viewing system according to the embodiment will be described with reference to FIG. 1.

Figure 1:
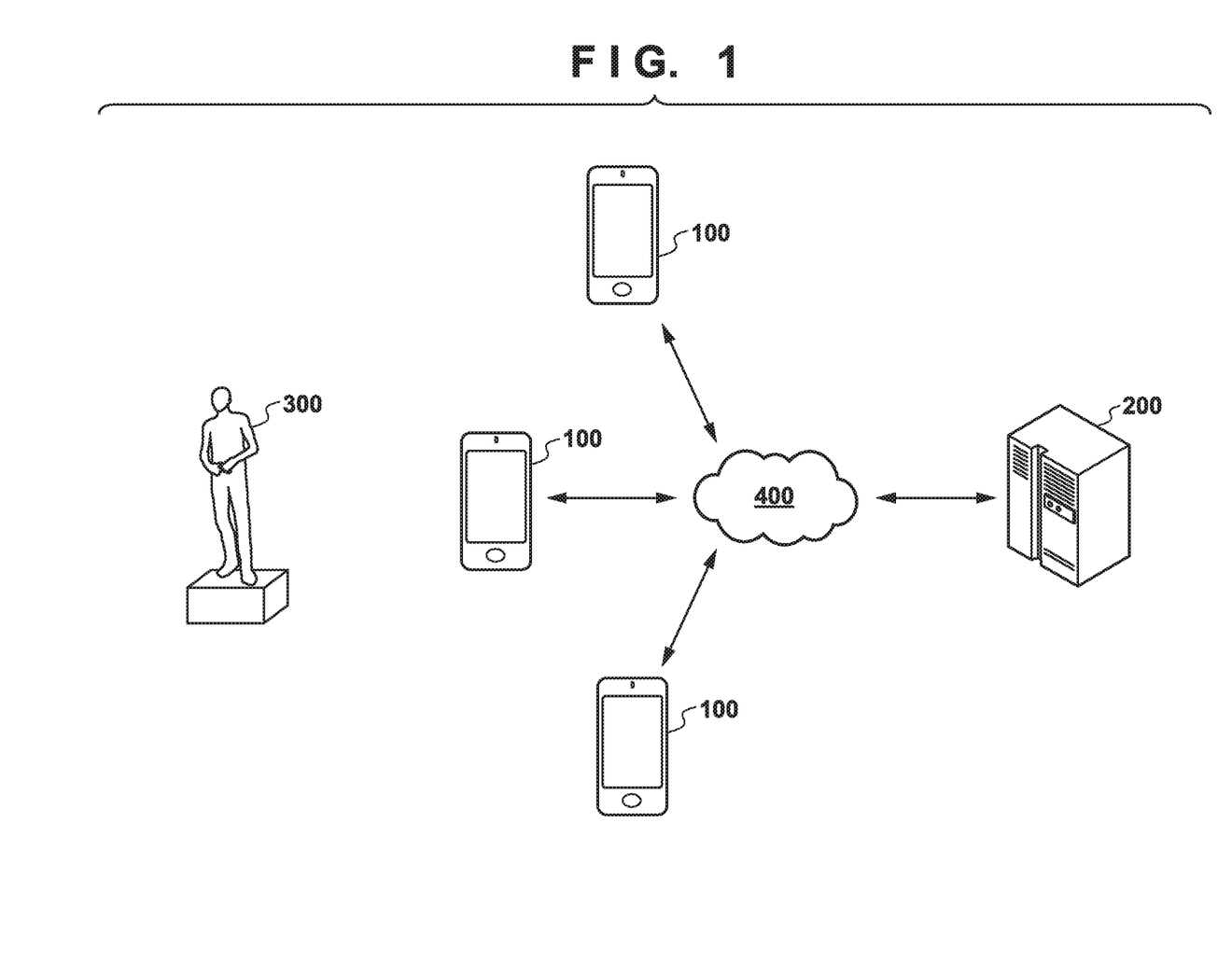
FIG. 1 is a view exemplifying the arrangement of a viewing system according to an embodiment of the present invention.

As shown in FIG. 1, a server 200 is configured to be able to communicate with one or more smartphones 100 in the viewing system according to the embodiment. The smartphones 100 and the server 200 are configured to be able to establish a communication connection via a network 400, and can transmit/receive various kinds of information during the communication connection.

The smartphone 100 has an image capturing function and can obtain visual information of an object present in a physical world by image capturing. In the example of FIG. 1, the object whose visual information is obtained is a figure 300. However, the object is not limited to this in the practice of the present invention, and the object is arbitrary. A captured image of the figure 300 obtained by image capturing of the smartphone 100 is sent via the network 400 and used to create a 3D model in the server 200 based on the image. The thus-created 3D model is provided from the server 200 to the smartphone 100 and stored.

Once the 3D model of the figure 300 is created, the viewing system according to the embodiment can provide the user via a display unit 120 of the smartphone 100 with a viewing experience (visual presentation of augmented reality) as if the figure 300 were arranged in the physical world even when the figure 300 is not arranged in the physical world. More specifically, the smartphone 100 can implement a viewing experience of the figure 300 by rendering the 3D model of the figure 300 in a mode corresponding to the position and posture of the smartphone 100, and overlaying and displaying the 3D model on a captured image obtained in real time.

<Arrangement of Smartphone 100>

Figure 2:
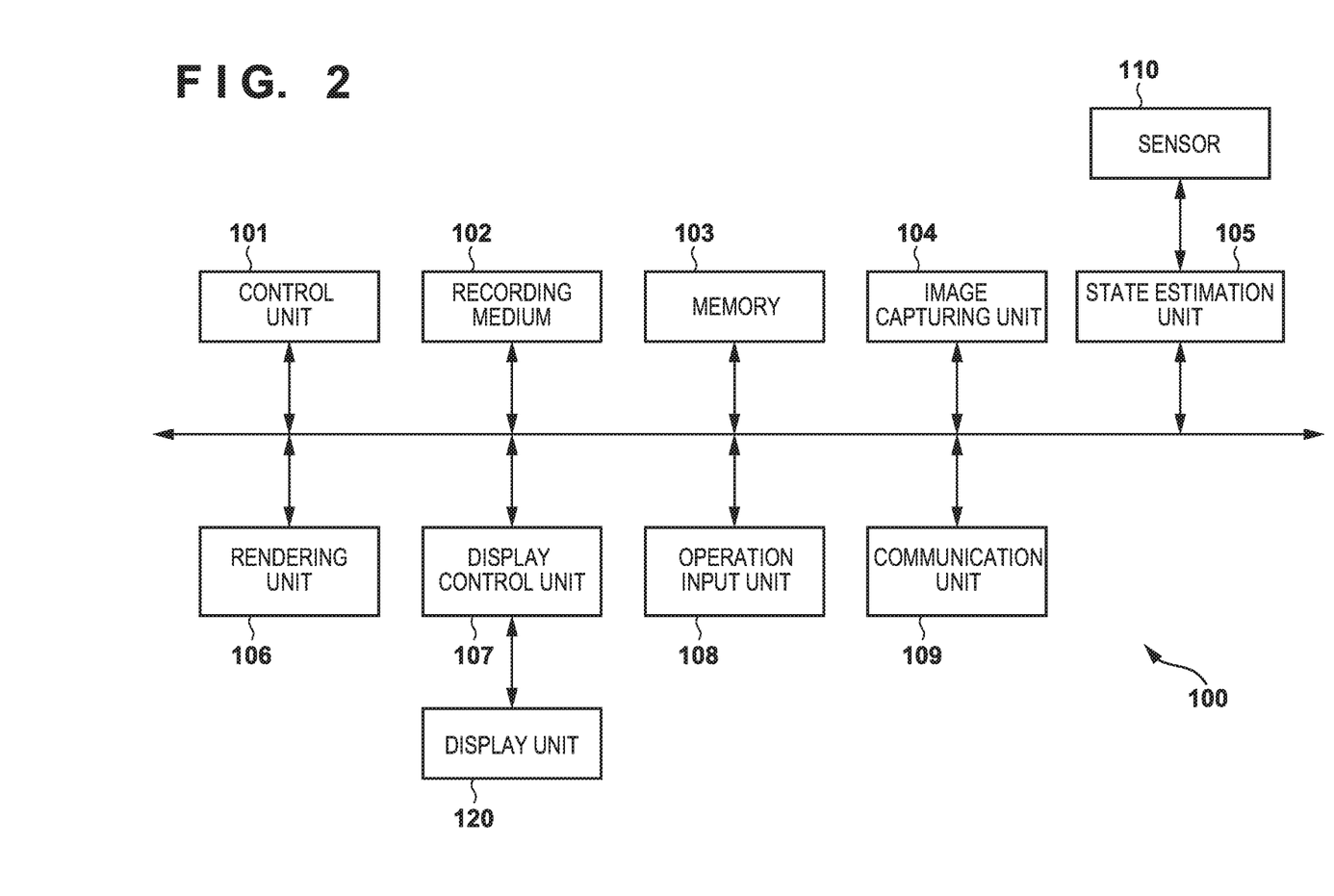
FIG. 2 is a block diagram showing the functional arrangement of a smartphone 100 according to the embodiment of the present invention.

The functional arrangement of the smartphone 100 according to the embodiment will be described with reference to FIG. 2.

A control unit 101 is, for example, a CPU and controls the operation of each block of the smartphone 100. More specifically, the control unit 101 controls the operation of each block by, for example, reading out the operation program of each block and an application program (AR application) regarding presentation of augmented reality according to the present invention that are recorded on a recording medium 102, deploying them in a memory 103, and executing them.

The recording medium 102 is a recording device capable of permanently holding data, such as a nonvolatile memory or an HDD. The recording medium 102 records the operation program of each block of the smartphone 100 and in addition, parameters and the like necessary for the operation of each block, programs regarding the AR application according to the embodiment, and information such as various GUIs and rendering objects used to present a screen regarding the application. The memory 103 is a storage device used for temporary data storage, such as a volatile memory. The memory 103 is used not only as an deploying area for the operation program of each block, but also as a storage area for temporarily storing data and the like output in the operation of each block.

An image capturing unit 104 is an image capturing device unit including an image sensor such as a CCD or CMOS sensor, and is used to obtain visual information of the physical world. More specifically, the image capturing unit 104 obtains appearance information of the figure 300 for creating a 3D model and also obtains a background image (actually captured image) during execution of the AR application.

A state estimation unit 105 derives the state of the smartphone 100. To simplify the description in the embodiment, the state estimation unit 105 obtains a detection result from a sensor 110 that may include, for example, an acceleration sensor or a gyro sensor, and estimates the 3D position and posture of the smartphone 100. The derivation of the position and posture of the smartphone 100 is not limited to this, and the position and posture of the smartphone 100 may be derived based on a sensing result from a device provided outside the smartphone 100, or moving estimation based on successively captured images.

A rendering unit 106 includes a rendering device such as a GPU, and performs rendering processing of generating a screen to be displayed on the display unit 120. More specifically, during execution of the AR application, the rendering unit 106 performs rendering processing based on processing and commands performed by the control unit 101, and the state estimation result of the smartphone 100 derived by the state estimation unit 105. The rendering unit 106 arranges a 3D model obtained from the server 200 in a rendering 3D space provided in correspondence with the physical space, and renders the 3D model from a viewpoint corresponding to the position and posture of the smartphone 100. The rendering unit 106 overlays the rendering result on a corresponding captured image, thereby generating a screen of the AR application that presents augmented reality.

Note that the arrangement position of a 3D model in the 3D space may be decided at, for example, a position set in advance based on an instruction input with respect to a captured image, or a position in a plane detected in the captured image. In the former case, a normal to a plane at the set position is obtained, and the arrangement posture of the 3D model is determined based on the normal information.

A display control unit 107 controls display on the display unit 120 as one mode of information presentation in the smartphone 100. More specifically, during execution of the AR application, the display control unit 107 displays a screen generated by the rendering unit 106 on the display unit 120 and presents augmented reality as if the figure 300 existed in the physical world. The display unit 120 is, for example, a display device of the smartphone 100, such as a LCD. In the description of the embodiment, the display unit 120 is incorporated in and integrated with the smartphone 100 in order to change the display mode in accordance with the position and posture of the smartphone 100 and present the 3D model of the figure 300. However, the practice of the present invention not limited to this, and the display device that displays a screen presenting augmented reality may be separated from a device that captures an image.

An operation input unit 108 is a user interface of the smartphone 100 such as a touch panel or a button. When the operation input unit 108 detects an operation input from the user, it outputs a control signal corresponding to the operation input to the control unit 101.

A communication unit 109 is a communication interface of the smartphone 100 that is used to communicate with another device. The communication unit 109 is connected to, for example, the server 200 or the like present on the network 400 by a predetermined communication method regardless of wired/wireless communication, and transmits/receives data. Information such as the program of the AR application may be received from an external device via the communication unit 109.

<Arrangement of Server 200>

Figure 3:
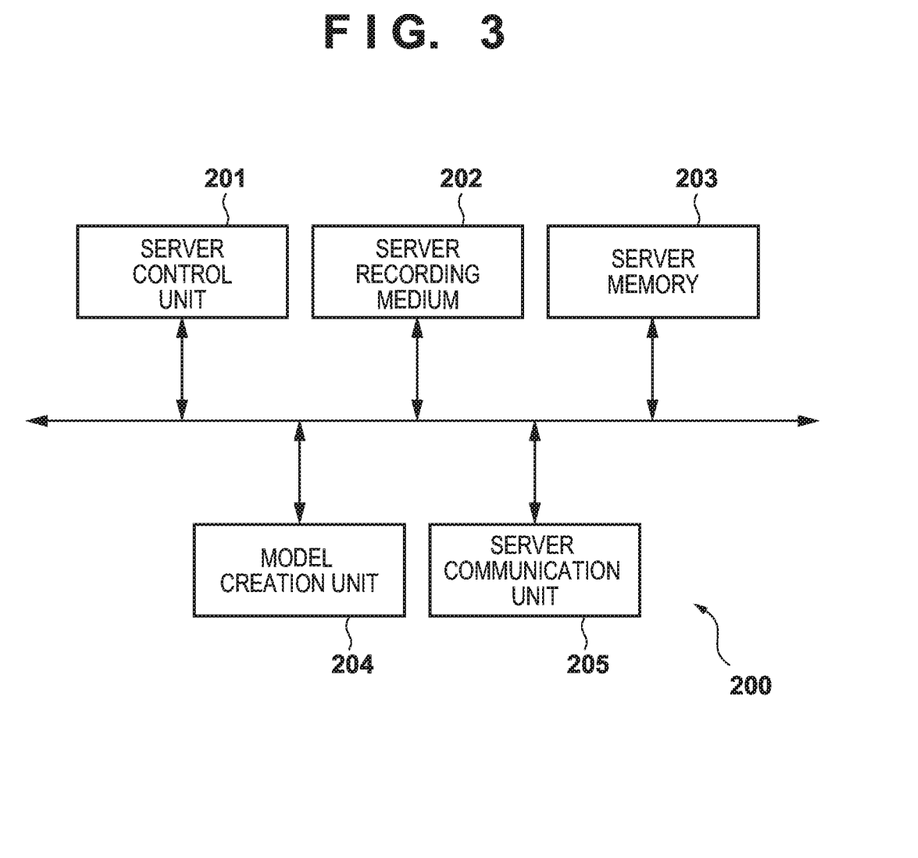
FIG. 3 is a block diagram showing the functional arrangement of a server 200 according to the embodiment of the present invention.

Next, the functional arrangement of the server 200 according to the embodiment will be described with reference to the block diagram of FIG. 3.

A server control unit 201 controls the operation of each block of the server 200. More specifically, the server control unit 201 controls the operation of each block by reading out the operation program of each block stored in a server recording medium 202, deploying it in a server memory 203, and executing it.

The server recording medium 202 is, for example, a rewritable nonvolatile memory and stores parameters and the like necessary for the operation of each block in addition to the operation program of each block of the server 200. The server memory 203 is a volatile memory and is used not only as a deploying area for the operation program of each block, but also as a storage area storing intermediate data and the like output in the operation of each block.

A model creation unit 204 creates a 3D model based on a captured image received from the smartphone 100. The viewing system according to the embodiment obtains information of the current appearance of the figure 300 in the physical world by image capturing, and creates a 3D model of the figure 300 representing the appearance. The model creation unit 204 creates the 3D model while complementing information of the plane and texture using images of the figure 300 captured from different directions. To simplify the description in the embodiment, information of the texture is included in information of the 3D model. However, it will be readily understood that the practice of the present invention is not limited to this.

A server communication unit 205 is a communication interface of the server 200 that is used to communicate with another device. The server communication unit 205 is connected to, for example, the smartphone 100 or the like present on the network 400 by a predetermined communication method regardless of wired/wireless communication, and transmits/receives data.

<<Model Creation Processing>>

Figure 4:
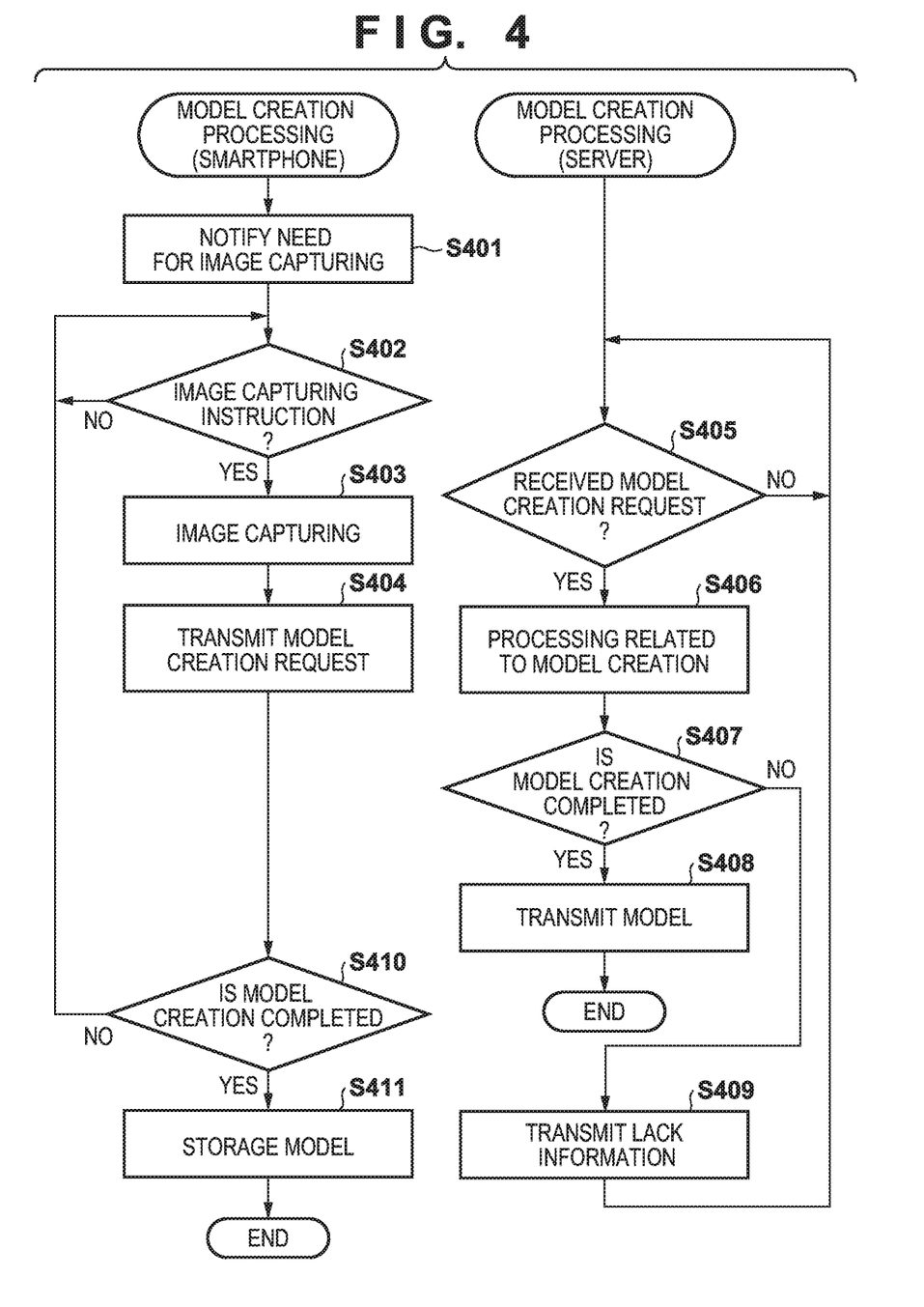
FIG. 4 is a flowchart exemplifying model creation processing performed in the viewing system according to the embodiment of the present invention.

Model creation processing of creating a 3D model of the figure 300 in the viewing system according to the embodiment having the above-described arrangement will be described in detail with reference to the flowchart of FIG. 4. Processing corresponding to the flowchart can be implemented by, for example, reading out corresponding processing programs stored in the recording medium 102 and the server recording medium 202 by the control unit 101 and the server control unit 201, deploying them in the memory 103 or the server memory 203, and executing them. In the model creation processing, processing on the smartphone 100 side starts when, for example, the AR application is activated in the smartphone 100 and an operation input regarding 3D modeling is received.

In step S401, under the control of the control unit 101, the display control unit 107 controls the display unit 120 to display a notification that prompts image capturing of the figure 300 to be three-dimensionally modeled. Assume that image data corresponding to the notification that prompts image capturing is stored in the recording medium 102, deployed in the memory 103 or a rendering memory (not shown), and used. The notification that prompts image capturing may include a notification that a plurality of types of captured images need to be obtained to create a 3D model of one figure 300.

In step S402, the control unit 101 determines whether an image capturing instruction has been issued. If the control unit 101 determines that an image capturing instruction has been issued, it shifts the process to step S403. If the control unit 101 determines that no image capturing instruction has been issued, it repeats the process of this step.

In step S403, under the control of the control unit 101, the image capturing unit 104 performs image capturing to obtain a captured image. To simplify the description in the embodiment, an image captured in this step includes an image of the figure 300. However, the practice of the present invention is not limited to this. For example, the control unit 101 may determine whether an image of the figure 300 appears in an output captured image, only when the image of the figure 300 appears, advance the process, and when no image appears, make a notification to this effect and return the process to step S401.

In step S404, the control unit 101 sends the captured image obtained in step S403 to the communication unit 109, and controls the communication unit 109 to transmit the captured image together with a model creation request to the server 200.

In step S405, the server control unit 201 determines whether it has received the model creation request from the smartphone 100. If the server control unit 201 determines that it has received the model creation request from the smartphone 100, it shifts the process to step S406. If the server control unit 201 determines that it has not received the model creation request, it repeats the process of this step.

In step S406, under the control of the server control unit 201, the model creation unit 204 executes, based on the captured image obtained together with the model creation request, processing regarding creation of a 3D model of the figure 300 included in the image. The processing regarding creation of a 3D model may include extraction of an image corresponding to the figure 300 in the captured image, estimation of the shape of the figure 300 based on the extracted image, and generation of a texture regarding the 3D model (these processes will be referred to as analysis of a captured image hereinafter). The texture may be included in data of a created 3D model so that it can be provided together with the data.

When a 3D model is created by only analysis of a captured image, a plurality of types of captured images (images captured from a plurality of directions) are required to create entire circumference planes of the figure 300. The model creation unit 204 creates a 3D model based on only analysis of a captured image in the embodiment, but the practice of the present invention is not limited to this. For example, when depth information about an image capturing range can be obtained at the same time as image capturing, a 3D model may be created based on the depth information and a captured image.

In step S407, the server control unit 201 determines whether the creation of the 3D model based on the received captured image is completed. As described above, whether the entire image of the figure 300 appears depends on the received captured image. When no 3D model can be created using all captured images received so far (for example, a plane of the 3D model is not closed or is missed), the server control unit 201 determines that the process of step S406 is not completed. If the server control unit 201 determines that the creation of the 3D model based on the received captured image is completed, it shifts the process to step S408. If the server control unit 201 determines that the creation of the 3D model is not completed, it shifts the process to step S409.

In step S408, the server control unit 201 transmits the created 3D model to the server communication unit 205, controls the server communication unit 205 to transmit it to the smartphone 100, and completes the model creation processing on the server 200 side.

If the server control unit 201 determines that the creation of the 3D model based on the received captured image is not completed, it controls the server communication unit 205 in step S409 to transmit to the smartphone 100 "lack information" representing a lack of a captured image necessary to create a 3D model of the figure 300. Then, the server control unit 201 returns the process to step S405. The lack information may include, for example, information representing the direction of a lacking captured image of the figure 300 based on the situation of the processing regarding creation of the 3D model.

In step S410, the control unit 101 determines whether the 3D model has been created based on the transmitted captured image. The determination in this step may be made based on which of the 3D model and the lack information has been received from the server 200. If the control unit 101 determines that the 3D model has been created based on the transmitted captured image, that is, if the control unit 101 has received the 3D model, it shifts the process to step S411. If the 3D model has not been created based on the transmitted captured image, that is, if the control unit 101 has received the lack information, it sends a notification that image capturing from a different direction is necessary to create the 3D model, and then returns the process to step S402.

In step S411, the control unit 101 adds an identifier such as a file name to the received 3D model, stores the 3D model in the recording medium 102, and completes the model creation processing on the smartphone 100 side.

By this processing, the viewing system according to the embodiment can create a 3D model of the figure 300 having an appearance at the time of image capturing.

<<Model Presentation Processing>>

Figure 5:
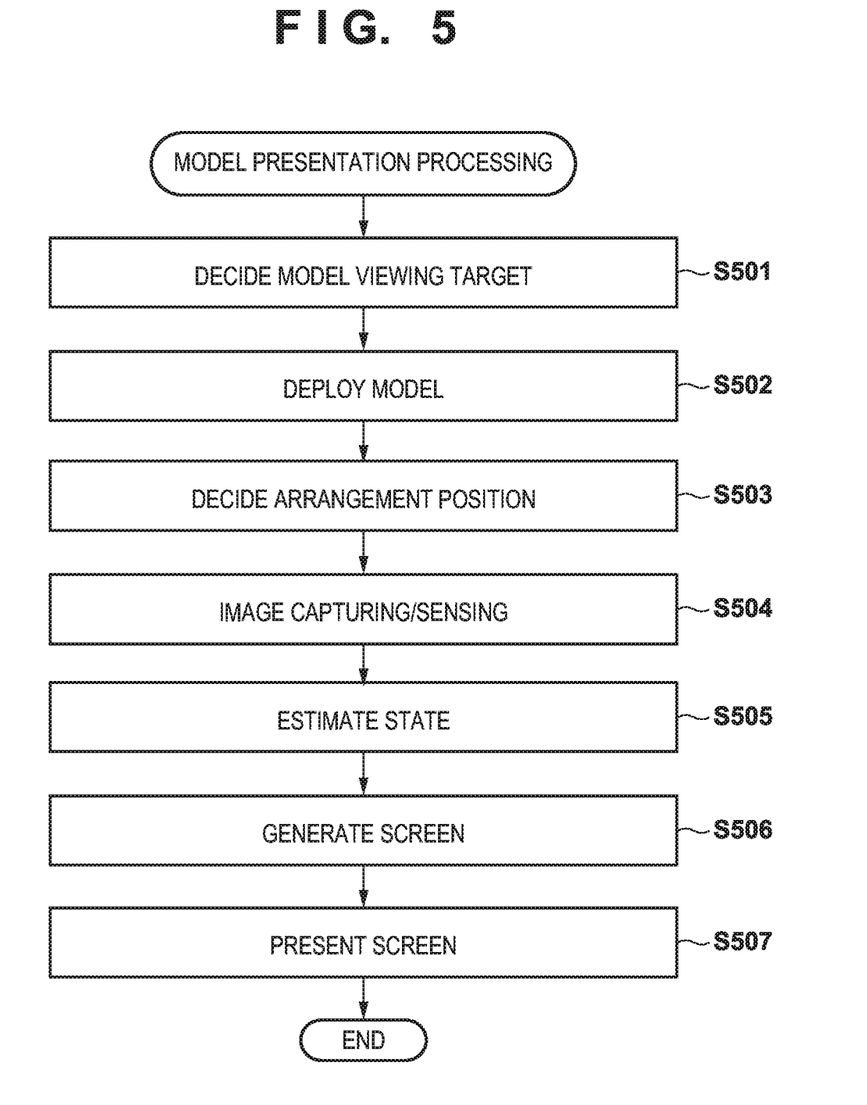
FIG. 5 is a flowchart exemplifying model presentation processing executed in the smartphone 100 according to the embodiment of the present invention.

Next, model presentation processing of presenting augmented reality using the created 3D model of the figure 300 in the smartphone 100 according to the embodiment will be described in detail using the flowchart of FIG. 5. Processing corresponding to the flowchart can be implemented by, for example, reading out the program of a corresponding AR application stored in the recording medium 102 by the control unit 101, deploying it in the memory 103, and executing it.

Note that the model presentation processing starts when, for example, the AR application is activated in the smartphone 100 and an operation input regarding viewing of a created 3D model is received. When the model presentation processing is performed, the user need not arrange the figure 300 in the physical world.

In step S501, the control unit 101 decides a 3D model to be viewed (3D model of a viewing target). More specifically, the control unit 101 controls the display control unit 107 to display a list of 3D models stored in the recording medium 102, and in response to a 3D model selection operation to the list, decides the selected 3D model as a viewing target.

In step S502, the control unit 101 reads out the decided 3D model of the viewing target from the recording medium 102, and deploys it in the memory 103.

In step S503, the control unit 101 decides a position in the physical world where the 3D model of the viewing target is arranged. Although a detailed description of the process of this step will be omitted, the arrangement position of the 3D model of the viewing target in a rendering 3D space (to be referred to as a rendering space hereinafter) associated with a physical space in an image capturing range may be decided by, for example, accepting an operation input regarding designation of an arrangement position for a setting image obtained by image capturing, detecting a plane at this arrangement position, and deriving the positional relationship between the arrangement position and the smartphone 100.

Processes performed to generate an image of each frame presented on the display unit 120 in a period in which augmented reality is presented in the AR application will be explained. In FIG. 5, subsequent processes are looped for convenience. Needless to say, these processes performed for one frame sequentially start in parallel in accordance with the frame rate regarding presentation.

In step S504, the control unit 101 controls the image capturing unit 104 to capture an image for a frame (presentation frame) presenting augmented reality regarding the 3D model, and output a background image. At this time, the control unit 101 controls the sensor 110 to change to a detectable state and perform detection at the time of capturing a background image.

In step S505, under the control of the control unit 101, the state estimation unit 105 derives the state of the smartphone 100 at the time of capturing a background image. The AR application according to the embodiment reflects the 3D position and posture of the smartphone 100 in the presentation of augmented reality. The state estimation unit 105 derives these pieces of information based on the detection result of the sensor 110 at the time of image capturing.

In step S506, under the control of the control unit 101, the rendering unit 106 generates a screen presenting augmented reality regarding the presentation frame. More specifically, the rendering unit 106 decides a viewpoint position and posture in the rendering space based on the state of the smartphone 100 at the time of image capturing, and renders the 3D model arranged in this space from this viewpoint. Further, the rendering unit 106 superimposes the rendered 3D model on the background image, generating a screen regarding the presentation frame.

In step S507, under the control of the control unit 101, the display control unit 107 controls the display unit 120 to display the screen regarding the presentation frame.

By this processing, the viewing system according to the embodiment can present augmented reality using a 3D model created based on an actually captured image in model creation processing.

As described above, the viewing system according to the embodiment can implement presentation of augmented reality in a mode the user wants, based on the figure 300 in the physical world. That is, the user sets the figure 300 in a state he/she wants, and captures an image of the figure 300. After that, the user can view the figure 300 in this state in the presentation of augmented reality using a 3D model created based on the captured image.

The user can view the figure 300 at a tuning and location he/she wants in the mode of presentation of augmented reality without preparing a display space for the figure 300. Also, the user can view at an arbitrary timing even a figure 300 which is very rare and valuable and which the user wants to pack and save in a box, without taking the figure 300 out and in the box. Since a 3D model is created by reflecting the state of the figure 300 at the time of image capturing, the figure 300 in a state the user wants, such as a figure 300 configured to be able to replace an accessory or change a pose, or a figure 300 painted by the user him/herself, can be three-dimensionally modeled. By creating a 3D model in this way, the user can view the figure 300 in a state he/she wants at an arbitrary timing without any labor.

[Modification 1]

In the above-described embodiment, a 3D model of the figure 300 is created by performing only analysis of a captured image or further combining depth information in the server 200. However, the practice of the present invention is not limited to this. Information obtained by operating the smartphone 100 or the like by the user, such as a captured image, may not always include information of high precision depending on the state or illumination condition (image capturing environment) of the target figure 300. As a result, the quality of a created 3D model may be poor. That is, depending on information used for creation, 3D model data may not precisely reproduce the appearance of the figure 300. To prevent this, for example, at least part of a 3D model to be created may use data of a 3D model held in the server 200 before receiving a model creation request. The data of the 3D model held in advance in the server 200 can be, for example, CAD data or texture set prior to manufacturing the figure. This data represents the shape and appearance of the figure more precisely than a 3D model created by analysis of a captured image.

Figure 6:
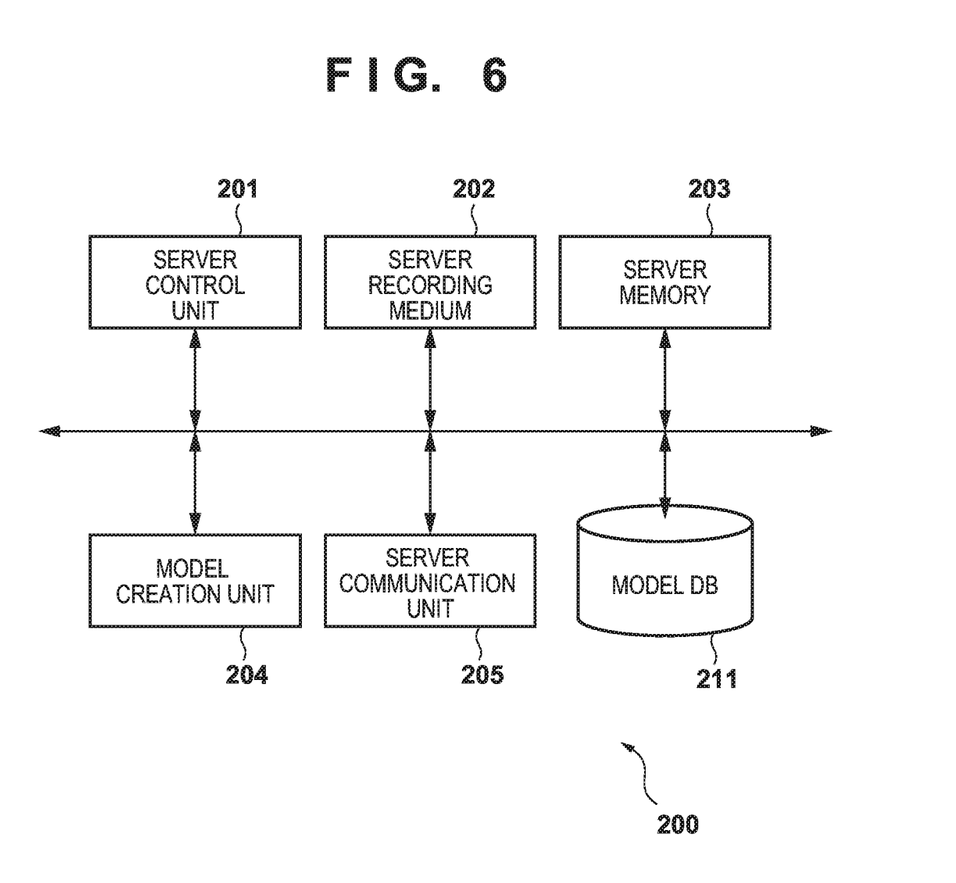
FIG. 6 is a block diagram exemplifying the arrangement of a viewing system according to a modification of the present invention.

As shown in FIG. 6, the server 200 according to the modification further includes a model DB 211 in addition to the arrangement in the above-described embodiment. The model DB 211 is a database that manages, for each figure (target) selected in advance, feature information describing the feature of an appearance for distinguishing the figure, and preset model information including data of a 3D model (preset model) created in advance. The model DB 211 may manage not the preset models of all figures but, for example, the preset models of only some figures (commercial products) sold by a company that operates the viewing system or a sponsor company of the service.

<<Model Creation Processing>>

Figure 7:
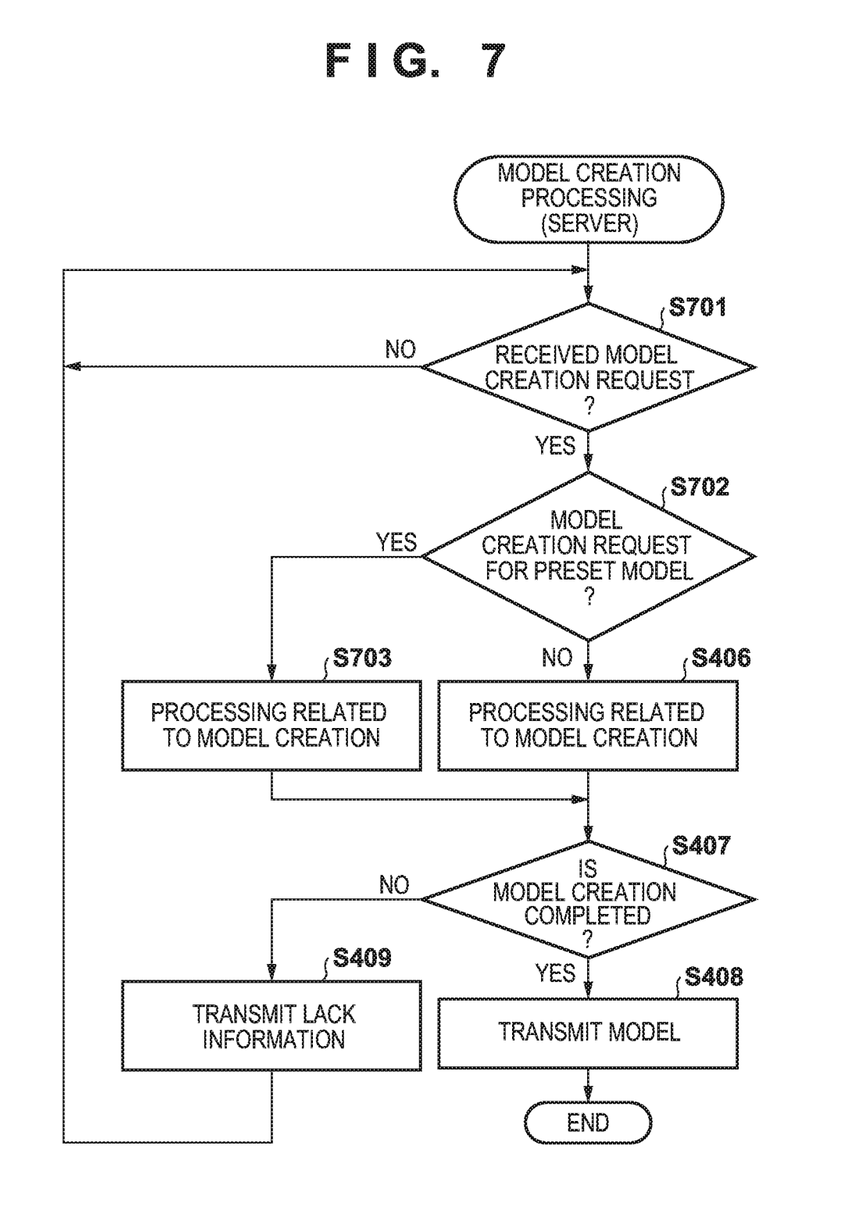
FIG. 7 is a flowchart exemplifying model creation processing performed in the viewing system according to the modification of the present invention.

Model creation processing in the viewing system according to the modification will be described in detail with reference to the flowchart of FIG. 7. In the model creation processing according to the modification, only processes performed by the server 200 will be explained. Steps of performing processes similar to those of the creation processing according to the above-described embodiment will be denoted by the same reference numerals, and a description thereof will not be repeated. Processing corresponding to the flowchart can be implemented by, for example, reading out a corresponding processing program recorded on the server recording medium 202 by the server control unit 201, deploying it in the server memory 203, and executing it.

In step S701, the server control unit 201 determines whether a model creation request has been received from the smartphone 100. If the server control unit 201 determines that a model creation request has been received from the smartphone 100, it shifts the process to step S702. If the server control unit 201 determines that no model creation request has been received, it repeats the process of this step.

In step S702, under the control of the server control unit 201, the model creation unit 204 determines whether the model creation request has been issued for the figure 300 whose preset model information is managed in the model DB 211. More specifically, the model creation unit 204 specifies an area where an image corresponding to the figure 300 appears in a captured image obtained together with the model creation request, and extracts a feature from this area. The model creation unit 204 makes the determination in this step based on whether preset model information having feature information matching the extracted feature of the figure 300 is managed in the model DB 211. If the model creation unit 204 determines that the model creation request has been issued for the figure 300 whose preset model information is managed, it shifts the process to step S703. If the model creation unit 204 determines that the model creation request has been issued for another figure, it shifts the process to step S406.

In the embodiment, whether the figure 300 for which the model creation request has been issued is a figure whose preset model information is registered in advance in the model DB 211 is determined based on the image of the figure 300 appearing in the captured image. However, the practice of the present invention is not limited to this. For example, identification information attached to the figure 300 or its package, or information such as a receipt at the time of purchase may be additionally requested to improve the identification precision of the figure while reducing the processing load on the server 200.

In step S703, under the control of the server control unit 201, the model creation unit 204 executes processing regarding creation of a 3D model of the figure 300 based on the captured image obtained together with the model creation request and the preset model information managed in the model DB 211 for the captured figure 300. After that, the model creation unit 204 shifts the process to step S407. The processing regarding creation of a 3D model that is executed in this step may involve deforming, based on a captured image, data of a managed preset model included in preset model information for a corresponding figure.

For example, when the figure 300 is a movable figure capable of changing the pose, data of a managed preset model included in preset model information may be created as, for example, data in which a joint is set at a portion corresponding to a movable portion. In this case, the model creation unit 204 specifies the state of each movable portion based on the image of the figure 300 appearing in an obtained captured image. The model creation unit 204 changes the state value of each joint in the data of the preset model based on the specified state of each movable portion, and creates data of a 3D model to be transmitted to the smartphone 100.

Alternatively, for example, when the figure 300 is a figure exhibiting a fixed pose without any movable portion, the model creation unit 204 may directly handle data of a preset model as data of a 3D model to be transmitted to the smartphone 100.

In a mode in which the figure 300 is a movable figure, all the movable portions of the figure 300 may not appear in a captured image obtained together with a model creation request so that the state of the figure 300 can be specified. In this case, the server control unit 201 determines in step S407 that the creation of the 3D model based on the received captured image is not completed, and transmits lack information to the smartphone 100 in step S409. The lack information is not limited to one representing an image capturing direction in which image capturing lacks in the above-described embodiment, but may include, for example, information for specifying a movable portion requiring additional image capturing.

By this processing, when a model creation request is issued for the specific figure 300 whose preset model information is registered, the viewing system according to the modification can reduce the arithmetic amount of analysis processing on a captured image necessary for creation, and create data of a 3D model of the figure 300. In a mode in which data of a 3D model is created based on only analysis of a captured image, the projecting/retracting shape of the 3D model, the texture of details, the color tint, and the like may not appear in a captured image depending on the performance of an image capturing device and image capturing conditions such as illumination and image capturing settings. In this case, the precision of data of the created 3D model may decrease. However, in the viewing system according to the modification, when the figure 300 is a specific figure, the precision can be preferably increased using data of a preset model.

In the modification, a mode has been described in which data of a preset model supplied from a maker such as a figure maker is registered in the model DB 211. However, the practice of the present invention is not limited to this, and it is only necessary that data of a preset model registered in the model DB 211 is data of a 3D model created before receiving a model creation request. That is, data of a preset model used when a model creation request is transmitted in response to capturing the figure 300 by a user with the smartphone 100 suffices to be data stored in the model DB 211 before receiving the model creation request. The data may be, for example, data of a 3D model created for the figure 300 of the same product based on a request from the user or another user.

In this case, the data of the preset model used is preferably higher in resolution than data of a 3D model created by performing analysis of a captured image. Thus, the data of the preset model may be stored in the model DB 211 on condition that a predetermined evaluation criterion is satisfied. The use of the data of the preset model stored in the model DB 211 for the figure 300 of the same product may be restricted to a case in which the data of the preset model stored in the model DB 211 is higher in evaluation (resolution) than data of a 3D model that will be created by performing analysis of a captured image received together with a model creation request. The evaluation may be made based on the spatial resolution of data of a 3D model or the contrast ratio in the texture so that a higher evaluation is derived for a higher resolution (higher spatial resolution or higher contrast ratio).

In the description of the modification, whether to use data of a preset model is controlled by determining whether a figure whose image appears in a captured image received together with a model creation request is a figure whose preset model information is managed in the model DB 211. However, the practice of the present invention is not limited to this. For example, the use of data of a preset model may be allowed for only a product of a providing company of a service regarding the viewing system or a specific distributor. That is, the determination in step S702 may be made by determining whether a figure whose image appears in a captured image is a product of a providing company or a product of a specific distributor.

[Modification 2]

In modification 1 described above, a mode is explained in which when there is preset model information for a figure whose image appears in a captured image received together with a model creation request, the pose is changed based on the captured image using preset model data of the preset model information, thereby creating data of a 3D model to be provided to the smartphone 100. However, the practice of the present invention is not limited to this. Data of a 3D model to be provided to the smartphone 100 may be created by combining data of a preset model and data of a 3D model created by performing analysis of the captured image.

As described in the embodiment, the viewing system according to the present invention three-dimensionally models the figure 300 in a state the user wants, and allows the user to view the 3D model on his/her terminal. That is, the mode of state change of the figure 300 by the user is not limited to change of the pose as in modification 1, and includes even change of the appearance such as replacement of an accessory or change of the paint. In pose change of data of a preset model, data of a 3D model in a state the user wants is not always created. The pose may be changed using even data of a 3D model of an accessory or the like that is stored similarly in the model DB 211. However, it is not practical to comprehensively store data of preset models of all kinds of accessories in the model DB 211 so that even an accessory or the like made by the user can be reflected to achieve an appearance he/she wants. Considering this, model creation processing in the server 200 according to the modification is performed as follows.

When a model creation request is received from the smartphone 100, the model creation unit 204 determines under the control of the server control unit 201 whether the model creation request has been issued for the figure 300 whose preset model information is managed in the model DB 211. At this time, the appearance of the figure 300 may have been changed, so the model creation unit 204 makes this determination based on whether the model DB 211 manages preset model information having feature information whose similarity with a feature extracted from the image of a figure appearing in a captured image exceeds a threshold.

If there is preset model information in which the similarity of the feature information exceeds the threshold, the model creation unit 204 determines that the model creation request has been issued for a figure (candidate figure) of highest similarity, and creates data of a 3D model. More specifically, when creating data of a 3D model of the figure 300, the model creation unit 204 performs creation change regarding a difference in appearance based on data of a preset model of the candidate model, and creates data of the 3D model to be provided to the smartphone 100.

The creation change regarding a difference in appearance from the candidate figure is implemented by creating data of another 3D model for a portion not matching the feature of the candidate figure out of the image of the figure 300 appearing in the captured image, and performing application, replacement, and built-in of the data to a corresponding portion of data of the preset model of the candidate figure. That is, as for the mismatching portion, the model creation unit 204 creates data of a 3D model based on analysis of the captured image. More specifically, the model creation unit 204 extracts an area not matching the feature of the candidate figure out of the image of the figure 300 appearing in the captured image, performs processing including shape estimation of an article in the area and texture generation, and creates data of a 3D model of the article (accessory or part).

By this processing, while data of a high-resolution preset model can be used for a specific figure, data of a 3D model to be provided to the smartphone 100 can be created in a state in which an appearance change by the user after obtaining a figure is flexibly reflected.

In the above-described embodiment and modifications, data of a 3D model reflecting the appearance of an article can be easily obtained for any article by using the viewing system according to the present invention. However, the practice of the present invention is not limited to this. For example, 3D modeling is not permitted for all articles in terms of merchandising a target. Instead, information of article types for which 3D modeling is possible is registered in advance in the server 200. Only when it is determined that the target is an article of the pre-registered type, processing regarding creation of data of a 3D model is executed.

Additional Embodiments (1) For example, 3D model data of a background, building, and the like in a game are provided in advance to the smartphone side. When presenting a 3D model of a figure in a mode in which augmented reality is presented, these 3D model data are displayed together. This can implement a greater variation of viewing.

(2) A set of 3D model data of a background, building, and the like in a game in (1) may be packaged and provided as a diorama. The diorama may present augmented reality using all objects as static objects, or present augmented reality using some objects (for example, a train moving in the background) as moving objects. At this time, a sound such as a sound effect may be output.

(3) Augmented reality may be presented with an object constituting the diorama in (2) or a 3D model of a figure in a mode in which the motion is controlled by a user's operation.

(4) A 3D model of a figure, the diorama, and the like may be shared with another user through SNS or the like, not simply as a screenshot but as a movie presenting augmented reality or information enabling 3D viewing on an arbitrary terminal.

Other Embodiments

The invention is not limited to the foregoing embodiments, and various variations/changes are possible within the spirit of the invention. Also, the viewing system according to the present invention are realizable by a program executing the methods on one or more computers. The program is providable/distributable by being stored on a computer-readable storage medium or through an electronic communication line.

What is claimed is:

1. A viewing system which presents augmented reality of a 3D model representing an appearance of a target, comprising:
   at least one processor; and
   at least one memory including at least one set of instructions that, when executed by the at least one processor, causes the viewing system to perform operations including:
   registering information of article types in a server;
   obtaining a captured image of the target;
   determining based on the captured image whether the target is an article of a pre-registered type of the article types registered in the server;
   creating a 3D model of the target included in the captured image, if the target is of the pre-registered type of the article types registered; and
   presenting the 3D model of the target,
   wherein if the at least one processor determines that the target included in the captured image is a movable figure including a plurality of movable portions and being capable of changing a pose thereof at the movable portions, and the target is not being continuously moved by a user in a real world, creating the 3D model of the target comprises:
   analyzing the captured image to specify the movable portions of the movable figure included in the captured image;
   analyzing the captured image specify a state of each of the specified movable portions of the movable figure included in the captured image;
   setting, to the 3D model, a joint set at a portion corresponding to each of the specified movable portions of the movable figure; and
   changing a state value of each joint of the 3D model based on the specified state of each of the specified movable portions.

2. The system according to claim 1, wherein the at least one processor is configured to perform creating the 3D model of the target on condition that a plurality of types of captured images of the target are obtained.

3. The system according to claim 1, further comprising a storage configured to store a preset model serving as a 3D model created in advance for a predetermined article,
   wherein the operations further comprise determining based on the captured image whether the target is the predetermined article, and
   wherein if the at least one processor determines that the target is the predetermined article, creating the 3D model of the target comprises using a preset model corresponding to the target among preset models stored in advance in the storage.

4. The system according to claim 3, wherein if the at least one processor determines that the target is the predetermined article, creating the 3D model of the target comprises deforming the preset model corresponding to the target based on an image of the target appearing in the captured image.

5. The system according to claim 3, wherein the operations further comprise:
   specifying an appearance-changed portion from the predetermined article corresponding to the target;
   wherein if the at least one processor determines that the target is the predetermined article, creating the 3D model of the target comprises:
   creating another 3D model by analyzing the captured image for the appearance-changed portion; and
   combining the other 3D model with the preset model corresponding to the target.

6. The system according to claim 3, wherein if the at least one processor determines that the target is the predetermined article, the operations further comprise handling the preset model corresponding to the target as the 3D model of the target.

7. The system according to claim 3, wherein if the at least one processor determines that the target is not the predetermined article, creating the 3D model of the target comprises analyzing the captured image without using the preset model.

8. The system according to claim 3, wherein a resolution of the preset model is higher than a resolution of a 3D model created by analyzing the captured image.

9. The system according to claim 1, wherein creating of the 3D model of the target based on the captured image includes at least one of:
   extracting a corresponding area in the captured image;
   estimating shapes; or
   generating texture.

10. A model creation apparatus which is configured to create a 3D model representing an appearance of a target, comprising:
    an image sensor configured to capture an image of the target;
    a processor configured to create a 3D model of the target included in the captured image, if the target is determined to be an article of a pre-registered type of article types; and
    a display configured to provide the 3D model of the target created by the processor,
    wherein if the target included in the captured image is a movable figure including a plurality of moveable portions and being capable of changing a pose thereof at the movable portions, and the target is not being continuously moved by a user in a real world, the movable portions of the movable figure included in the captured image are specified by analyzing the captured image, a state of each of the specified movable portions of the movable figure included in the captured image is specified by analyzing, the captured image, and the 3D model of the target is created by setting a joint set at a portion corresponding to each of the specified movable portions of the movable figure and changing a state value of each joint of the 3D model based on the specified state of each of the specified movable portions.

11. A method of controlling a model creation apparatus which is configured to create a 3D model representing an appearance of a target, the method comprising:
registering information of article types in a server;
obtaining a captured image of the target by an image sensor;
determining based on the captured image whether the target is an article of a pre-registered type of the article types registered in the server;
creating a 3D model of the target included in the captured image, if the target is of the pre-registered type of the article types registered; and
providing the 3D model of the target created,
wherein if the at least one processor determines that the target included in the captured image is a movable figure including a plurality of movable portions and being capable of changing a pose thereof at the movable portions, and the target is not being continuously moved by a user in a real world, creating the 3D model of the target comprises:
analyzing the captured image to specify the movable portions of the movable figure based on the captured image;
analyzing the captured image to specify a state of each of the specified movable portions of the movable figured included in the captured image;
setting, to the 3D model, a joint set at a portion corresponding to each of the specified movable portions of the movable figure; and
changing a state value of each joint of the 3D model based on the specified state of each of the specified movable portions.

12. A viewing system comprising:
at least one portable device;
a server configured to communicate with the at least one portable device on a network and further configured to register information of article types in advance; and
a display,
wherein the portable device is configured to obtain a captured image of the target,
wherein the server is configured to receive the captured image of the target from the portable device, to determine based on the captured image whether the target is an article of a pre-registered type of the article types registered, and further configured to create a 3D model of the target based on the captured image if the target is of the pre-registered type of the article types registered,
wherein the display is configured to present the 3D model of the target, and
wherein if the target included in the captured image is a movable figure including a plurality of moveable portions and being capable of changing a pose thereof at the movable portions, and the target is not being continuously moved h a user in a real world, the movable portions of the movable figure included in the captured image are specified by analyzing the captured image, a state of each of the specified movable portions of the movable figure included in the captured image is specified by analyzing the captured image, and the 3D model of the target is created by setting a joint set at a portion corresponding to each of the specified movable portions of the movable figures and changing a state value of each joint of the 3D model based on the specified state of each of the specified movable portions.

13. The system according to claim 12, wherein the server is configured to create the 3D model of the target on condition that a plurality of types of captured images of the target are obtained.

14. The system according to claim 12, wherein the server comprises a storage configured to store a preset model serving as a 3D model created in advance for a predetermined article,
wherein the server is configured to determine whether the target is the predetermined article based on the captured image, and
wherein if the server determines that the target is the predetermined article, the server is configured to create the 3D model of the target using a preset model corresponding to the target among preset models stored in advance in the storage.

15. The system according to claim 14, wherein if the server determines that the target is the predetermined article, the server is configured to create the 3D model of the target by deforming the preset model corresponding to the target based on an image of the target appearing in the captured image.

16. The system according to claim 14, wherein the server is further configured to specify an appearance-changed portion from the predetermined article corresponding to the target,
wherein if the server determines that the target is the predetermined article, the server is configured to create another 3D model by analyzing the captured image for the appearance-changed portion and combining the other 3D model with the preset model corresponding to the target.

17. The system according to claim 14, wherein if the server determines that the target is the predetermined article, the server is configured to handle the preset model corresponding to the target as the 3D model of the target.

18. The system according to claim 14, wherein if the server determines that the target is not the predetermined article, the server is configured to create the 3D model of the target by analyzing the captured image without using the preset model.

* * * * *